July 10, 1928.
J. RUDIN
1,677,120
COMBINATION LADLE AND STRAINER
Filed June 21, 1926
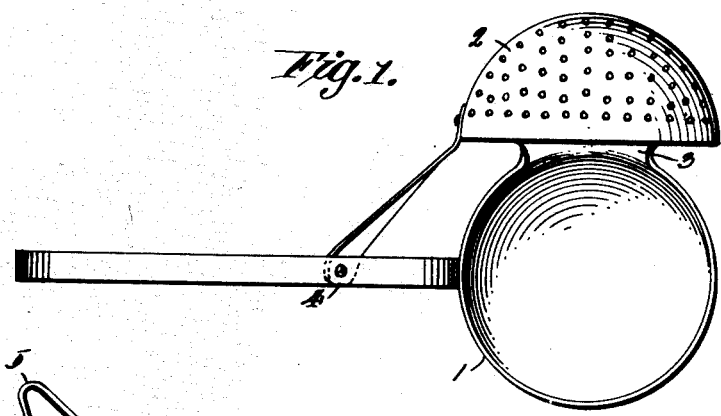
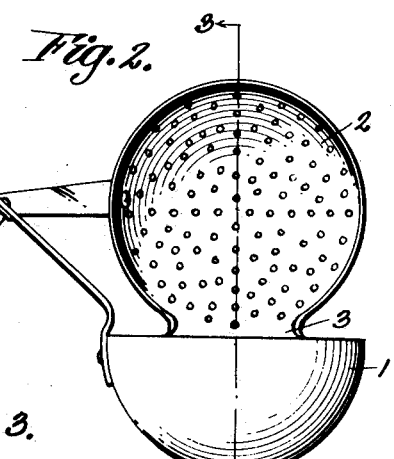
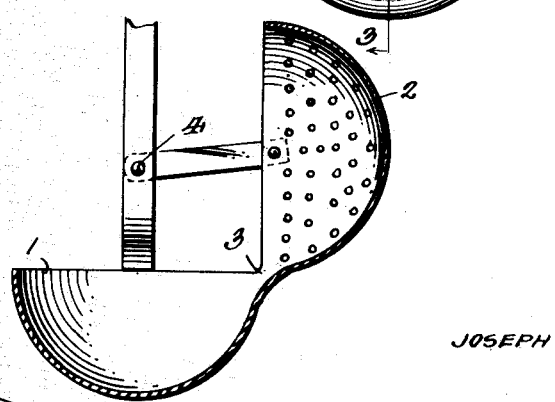
WITNESSES
Inventor
JOSEPH RUDIN
By
Attorney Patented July 10, 1928.

1,677,120

UNITED STATES PATENT OFFICE.

JOSEPH RUDIN, OF BROOKLYN, NEW YORK.

COMBINATION LADLE AND STRAINER.

Application filed June 21, 1926. Serial No. 117,540.

This invention relates to combined ladle and strainer as a unitary device, constituting a culinary utensil adapted readily to strain solid from liquid matter having a form to manufacture cheaply, be readily stored away when out of use, and do its work effectively.

The device comprises two metallic bowls in fixed relation angularly relatively one to the other with a handle attached to one terminating in a hook to support it when out of use. The bowls are stiffened by a metallic brace, one end of which is riveted to the handle and the other end to the bowl.

My invention therefore essentially comprises two cups to support a mixed liquid and solid, in fixed angular relation and preferably at right angles to each other, to the end that a liquid may be readily poured from the imperforate vessel to the strainer and the separation of the solid matter effected in a minimum time.

In the drawing illustrating my invention:

Figure 1 is an elevation of a combined ladle and strainer embodying the invention, Figure 2 is an elevation at right angles to that shown in Figure 1, Figure 3 is a part sectional view on the plane 3—3 of Figure 2.

Referring now to the drawings 1 represents an imperforate bowl and 2 a perforated bowl rigidly connected by a smooth curved wall 3 and positioned angularly with relation to each other, the edge of one bowl rim being braced on the handle at some distance from its connection with the bowl as indicated at 4. While the angular relation of the two bowls may be less than right angle I prefer to fix them in the right-angular relation. The end of the handle is provided with a hook 5 by which the utensil may be supported on the wall or in a cupboard. The device is, preferably for reasons of manufacturing expense, made of a plurality of pieces welded, brazed or soldered or otherwise securely connected so as to form a single unitary utensil and may be made of tinned iron, or an alloy, nickled or silver-plated. The two bowls while in widely spaced angular planes are connected in a smooth curve so as to permit a free flow of the liquid from one to the other, or may be made of a single homogeneous and integral structure formed of malleable metal as by dies and swaging. The device is preferably made in a number of different sizes of bowls and grades of perforations in the strainer.

From the foregoing it can be seen that I have provided an exceptionally simple and durable ladle and strainer formed from a single piece, in which the material may be readily poured from one bowl to the other simply by turning the wrist, so as to shift the positions of the bowls.

Changes in details may be made without departing from the spirit or scope of the invention; but what I claim is:

A combined ladle and strainer comprising an imperforate ladle bowl of substantially hollow semi-spherical form, a perforate strainer bowl of corresponding form, a neck connecting the bowls at relatively adjacent sides and in laterally offset, relatively spaced position with their open sides in planes substantially at right angles to each other, the said neck being concavely curved from side to side and convexly curved in a direction between the bowls, and a handle extending from the ladle bowl.

In testimony whereof I affix my signature.

JOSEPH RUDIN.